(12) United States Patent
Jeong et al.

(10) Patent No.: US 6,261,516 B1
(45) Date of Patent: Jul. 17, 2001

(54) NIOBIUM-CONTAINING ZIRCONIUM ALLOY FOR NUCLEAR FUEL CLADDINGS

(75) Inventors: Yong Hwan Jeong; Jong Hyuk Baek; Byoung Kwon Choi; Kyeong Ho Kim; Myung Ho Lee; Sang Yoon Park; Cheol Nam; Youn Ho Jung, all of Taejon-si (KR)

(73) Assignees: Korea Atomic Energy Research Institute, Taijon-si; Korea Electric Power Corporation, Seoul, both of (KR)

( * ) Notice: Subject to any disclaimer, the term of this patent is extended or adjusted under 35 U.S.C. 154(b) by 0 days.

(21) Appl. No.: 09/521,645

(22) Filed: Mar. 8, 2000

(30) Foreign Application Priority Data

Nov. 22, 1999 (KR) .................................................. 99-51889

(51) Int. Cl.⁷ .................................................. C22C 16/00
(52) U.S. Cl. ............................................ 420/422; 420/423
(58) Field of Search ...................................... 420/422, 423

(56) References Cited

U.S. PATENT DOCUMENTS

| | | | |
|---|---|---|---|
| 4,649,023 | * 3/1987 | Sabol et al. | ............................ 420/422 |
| 5,196,163 | 3/1993 | Matsuo et al. | . |
| 5,211,774 | * 5/1993 | Garde et al. | ............................ 148/421 |
| 5,254,308 | 10/1993 | Garde et al. | . |
| 5,560,790 | 10/1996 | Nikulina et al. | . |

FOREIGN PATENT DOCUMENTS

97/05628 * 2/1997 (WO) .

\* cited by examiner

*Primary Examiner*—George Wyszomierski
*Assistant Examiner*—Janelle Combs-Morillo
(74) *Attorney, Agent, or Firm*—Bachman & LaPointe, P.C.

(57) ABSTRACT

The invention presented herein relates to a niobium-containing zirconium alloy for use in nuclear fuel cladding. The Zr alloy of this invention with superior corrosion resistance is characterized as comprising an alloy composition as follows:

1) niobium (Nb), in a range of 0.8 to 1.2 wt. %; one or more elements selected from the group consisting of iron (Fe), molybdenum (Mo), copper (Cu) and manganese (Mn), in a range of 0.1 to 0.3 wt. %, respectively; oxygen (O), in a range of 600 to 1400 ppm; silicon (Si), in a range of 80 to 120 ppm; and the balance being of Zr, 2) Nb, in a range of 1.3 to 1.8 wt. %; tin (Sn), in a range of 0.2 to 0.5 wt. %; one element selected from the group consisting of Fe, Mo, Cu and Mn, in a range of 0.1 to 0.3 wt. %; O, in a range of 600 to 1400 ppm; Si, in a range of 80 to 120 ppm; and the balance being of Zr, 3) Nb, in a range of 1.3 to 1.8 wt. %; Sn, in a range of 0.2 to 0.5 wt. %; Fe, in a range of 0.1 to 0.3 wt. %; one element selected from the group consisting of chromium (Cr), Mo, Cu and Mn, in a range of 0.1 to 0.3 wt. %; O, in a range of 600 to 1400 ppm; Si, in a range of 80 to 120 ppm; and the balance being of Zr, and 4) Nb, in a range of 0.3 to 1.2 wt. %; Sn, in a range of 0.4 to 1.2 wt. %; Fe, in a range of 0.1 to 0.5 wt. %; one element selected from the group consisting of Mo, Cu and Mn, in a range of 0.1 to 0.3 wt. %; O, in a range of 600 to 1400 ppm; Si, in a range of 80 to 120 ppm; and the balance being of Zr.

4 Claims, No Drawings

NIOBIUM-CONTAINING ZIRCONIUM ALLOY FOR NUCLEAR FUEL CLADDINGS

FIELD OF THE INVENTION

The present invention relates to the compositions of niobium-containing zirconium (Zr) alloy with superior corrosion resistance. In particular, the present invention relates to the Zr alloys for nuclear fuel claddings.

DESCRIPTION OF THE PRIOR ART

Zr alloys have been widely used as fuel rod cladding and structural elements of nuclear reactor core owing to its low neutron absorption cross section, excellent corrosion resistance and good mechanical strength. Niobium (Nb) is well-known to improve the mechanical strength and the creep characteristics in addition to improve the corrosion resistance and to decrease the hydrogen uptake. Therefore, the recently-developed Zr alloys for nuclear fuel cladding are characterized as comprising Nb. However, the heat treatment condition needs to be optimized because the excess amount of Nb in Zr alloys will affect the corrosion resistance and the hydrogen uptake depending on the processing condition of the alloy.

As the prior art of Nb-containing zirconium alloy for nuclear fuel cladding, U.S. Pat. No. 5,254,308 discloses a Zr alloy in which the amount of Sn was reduced and Nb and Fe was contained to maintain the strength of the alloy. The alloy comprises Sn in a range of 0.45 to 0.75 wt. % (typically 0.6 wt. %), Fe in a range of 0.4 to 0.53 wt. % (typically 0.45 wt. %), Cr in a range of 0.2 to 0.3 wt. % (typically 0.25 wt. %), Nb in a range of 0.3 to 0.5 wt. % (typically 0.45 wt. %), Ni in a range of 0.012 to 0.03 wt. % (typically 0.02%), Si in a range of 50 to 200 ppm (typically 100 ppm) and 0 in a range of 1000–2000 ppm (typically 1600 ppm). Also the ratio of Fe/Cr was 1.5 and the amount of Nb was determined according to the amount of Fe, which affects to the hydrogen uptake. The good corrosion resistance and strength of the alloy was obtained by controlling the amount of Ni, Si, C and O.

U.S. Pat. No. 5,334,345 discloses the alloys, which comprise Sn in a range of 1.0 to 2.0 wt. %, Fe in a range of 0.07 to 0.70 wt. %, Cr in a range of 0.05 to 0.15 wt. %, Ni in a range of 0.16 to 0.40 wt. %, Nb in a range of 0.015 to 0.30 wt. % (typically 0.015 to 0.20 wt. %), Si in a range of 0.002 to 0.05 wt. % (typically 0.015 to 0.05 wt. %) and 0 in a range of 900 to 1600 ppm, for improving the corrosion resistance and the hydrogen-uptake resistance.

U.S. Pat. No. 5,336,690, wherein the amount of Sn, N and Nb was mainly controlled, discloses the alloys which comprise Sn in a range of 0 to 1.5 wt. % (typically 0.6 wt. %), Fe in a range of 0 to 0.24 wt. % (typically 0.12 wt. %), Cr in a range of 0 to 0.15 wt. % (typically 0.10 wt. %), N in a range of 0 to 2300 ppm, Si in a range of 0 to 100 ppm (typically 100 ppm), 0 in a range of 0 to 1600 ppm (typically 1200 ppm) and Nb in a range of 0 to 0.5 wt. % (typically 0.45 wt. %).

The Zr alloy disclosed in U.S. Pat. No. 5,211,774 was developed to improve the properties in ductility, creep strength and corrosion resistance under neutron irradiation environment, comprises Sn in a range of 0.8 to 1.2 wt. %, Fe in a range of 0.2 to 0.5 wt. % (typically 0.35 wt. %), Cr in a range of 0.1 to 0.4 wt. % (typically 0.25 wt. %), Nb in a range of 0 to 0.6 wt. %, Si in a range of 50 to 200 ppm (typically 50 ppm) and O in a range of 90 to 1800 ppm (typically 1600 ppm). It is the objective to reduce the hydrogen uptake and the variation of the corrosion resistance with variations in the processing condition of the alloy, by controlling the amount of Si.

EP No. 195,155 disclosed the Zr alloys which comprise Sn in a range of 0.1 to 0.3 wt. %, Fe in a range of 0.05 to 0.2 wt. %, Nb in a range of 0.05 to 0.4 wt. %, Cr, Ni or Cr and Ni in a range of 0.03 to 0.1 wt. %, and a duplex-type fuel cladding. In this alloy, the amount of Fe+Cr+Ni cannot exceed up to 0.25 wt. % and O was contained in a range of 300 to 1200 ppm.

EP No. 468,093 or U.S. Pat. No. 5,080,861 discloses a Zr alloy comprising Nb in a range of 0 to 0.6 wt. %, Sb in a range of O to 0.2 wt. %, Te in a range of 0 to 0.2 wt. %, Sn in a range of 0.5 to 1.0 wt. %, Fe in a range of 0.18 to 0.24 wt. %, Cr in a range of 0.07 to 0.13 wt. %, 0 in a range of 900 to 2000 ppm, Ni in a range of 0 to 70 ppm and C in a range of 0 to 200 ppm, for improving the corrosion resistance in high burn-up. In this alloy, the size of precipitate was limited 1200 to 1800 Å, and the alloy may include up to 0.2 wt. % of Bi (Bismuth) instead of Te (Tellurium) or Sb (Antimony).

The Zr alloy with similar composition to that of the above patent was suggested in EP No. 345,531. This alloy comprised Nb in a range of 0 to 0.6 wt. %, Mo in a range of 0 to 0.1 wt. %, Sn in a range of 1.2 to 1.7 wt. %, Fe in a range of 0.07 to 0.24 wt. %, Cr in a range of 0.05 to 0.13 wt. %, Ni in a range of 0 to 0.08 wt. % and O in a range of 900 to 1800 ppm.

The Zr alloy of EP No. 532,830 has the improved corrosion resistance, the stability under irradiation, the mechanical strength and the creep resistance. It comprises Nb in a range of 0 to 0.6 wt. %; Sn in a range of 0.8 to 1.2 wt. %; Fe in a range of 0.2 to 0.5 wt. % (typically 0.35 wt. %); Cr in a range of 0.1 to 0.4 wt. % (typically 0.25 wt. %); Si in a range of 50 to 200 ppm (typically 100 ppm); and O in a range of 900 to 1800 ppm (typically 1600 ppm).

The Zr alloy of FR No. 2,624,136, wherein Nb and V are contained, comprises Fe in a range of 0.1 to 0.35 wt. %, V in a range of 0.1 to 0.4 wt. %, O in a range of 0.05 to 0.3 wt. %, Sn in a range of 0 to 0.25 wt. % and Nb in a range of 0 to 0.25 wt. % and the ratio of V/Fe is more than 0.5. Also this patent discloses the optimum manufacturing process of the alloy.

JP No. 62,180,027 discloses the Zr alloy, which comprises Nb in a range of 1.7 to 2.5 wt. %, Sn in a range of 0.5 to 2.2 wt. %, Fe in a range of 0.04 to 1.0 wt. % for improving the mechanical strength and the nodular corrosion resistance. In this alloy, the content of Fe and Mo was limited to be from 0.2 to 1.0 wt. %.

JP No. 2,213,437 discloses a Nb-containing alloy besides Zr—Sn—Fe—V alloy to improve the nodular corrosion resistance. The alloy comprises Zr alloy in a range of 0.25 to 1.5 wt. %, Nb in a range of 0.15 to 1.0 wt. % and Fe, and Zr alloy in a range of 0.25 to 1.5 wt. %, Nb in a range of 0.5 to 1.0 wt. %, Sn in a range of 0.05 to 0.15 wt. % and Ni.

JP No. 62,207,835 discloses Zr—Nb—Sn based alloy, which comprises Zr alloy in a range of 0.2 to 2.0 wt. %, Nb in a range of 0.5 to 3.0 wt. %, Sn in a range of 900 to 2500 ppm and O.

JP No. 62,297,449 discloses the alloy composition which comprises Nb in a range of 1 to 2.5 wt. %, Sn in a range of 0.5 to 2.0 wt. %, Mo in a range of 0.1 to 1.0 wt. % and Mo+Nb in a range of 1.5 to 2.5 wt. % for the improvement of corrosion resistance, ductility and strength and a process by the solution treatment in a α+β or β region.

The Zr alloy with similar composition to that of the above patent except containing Fe was suggested in JP No. 62,180, 027. The alloy comprises Nb in a range of 1.7 to 2.5 wt. %, Sn in a range of 0.5 to 2.2 wt. %, Fe in a range of 0.04 to 1.0 wt. % and Mo in a range of 0.2 to 1.0 wt. %, wherein the total amount of Fe and Mo is in a range of 0.2 to 1.0 wt. %.

U.S. Pat. Nos. 4,863,685, 4,986,975, 5,024,809 and 5,026,516 disclose the Zr alloys which comprise Sn in a range of 0.5 to 2.0 wt. %, and other solute elements in a range of about 0.5 to 1.0 wt. %. The said alloys contain O in a range of 0.09 to 0.16 wt. %. More particularly, the alloy disclosed in U.S. Pat. No. 4,863,685 comprises other solute element, for example, Mo, Te and their mixture, or Nb—Te, Nb—Mo in addition to Sn. The alloy composition disclosed in U.S. Pat. No. 4,986,975 comprises solute elements such as Cu, Ni, Fe, etc. in a range from 0.24 to 0.40 wt. %, and Cu should be contained more than 0.05 wt. % in the alloy.

U.S. Pat. Nos. 5,024,809 and 5,026,516 disclose the alloys, comprising Mo, Nb, Te etc. as solute elements. And the amount was limited in a range of 0.5 to 1.0 wt. % which was the same as that of U.S. Pat. No. 4,863,685. Bi or Bi+Sn was added in a range of 0.5 to 2.5 wt. %.

U.S. Pat. No. 4,938,920 discloses the alloy with the improved corrosion resistance compared with Zircaloy-4, wherein the amount of Sn decreased in a range of 0 to 0.8 wt. %, and V in a range of 0 to 0.3 wt. %, and Nb in a range of 0 to 1 wt. %. In this alloy, Fe was added in a range of 0.2 to 0.8 wt. %, Cr in a range of 0 to 0.4 wt. %, and the total amount of Fe, Cr and V was limited to in a range of 0.25 to 1.0 wt. %. Also, the amount of O was in a range of 1000 to 1600 ppm. The alloys comprising 0.8 wt. % Sn-0.22 wt. % Fe-0.11 wt. % Cr-0.14 wt. % O, 0.4 wt. % Nb-0.67 wt. % Fe-0.33 wt. % Cr-0.15 wt. % O, 0.75 wt. % Fe-0.25 wt. % V-0.1 wt. % O or 0.25 wt. % Sn-0.2 wt. % Fe-0.15 wt. % V-0.1 wt. % O exhibited the superior corrosion resistance over Zircaloy-4 about 60% under 400° C. steam condition for 200 days and similar tensile strength to that of Zircaloy-4.

The alloy composition of the prior Zircaloy-4 was modified in U.S. Pat. No. 4,963,323 or JP No. 1,188,646 to develop a material for nuclear fuel cladding with the improved corrosion resistance. That is, the amount of Sn was decreased, Nb was added as compensation, and the amount of nitrogen was controlled to less than 60 ppm in this alloy. The Zr alloy comprises Sn in a range of 0.2 to 1.15 wt. %, Fe in a range of 0.19 to 0.6 wt. % (preferably 0.19 to 0.24 wt. %), Cr in a range of 0.07 to 0.4 wt. % (preferably 0.07 to 0.13 wt. %), Nb in a range of 0.05 to 0.5 wt. %, and less than 60 ppm of N.

Also, the composition of Zircaloy-4 was modified by adding Nb, Ta, V and Mo in U.S. Pat. No. 5,017,336. In particular, the Zr alloy comprises Sn in a range of 0.2 to 0.9 wt. %, Fe in a range of 0.18 to 0.6 wt. %, Cr in a range of 0.07 to 0.4 wt. %, Nb in a range of 0.05 to 0.5 wt. %, Ta in a range of 0.01 to 0.2 wt. %, V in a range of 0.05 to 1 wt. % and Mo in a range of 0.05 to 1 wt. %.

U.S. Pat. No. 5,196,163 or JP No. 63,035,751 discloses the Zr alloy whose composition is essentially similar to that of Zircaloy-4, containing Ta as well as Sn, Fe and Cr, and optionally Nb. The alloy comprises Sn in a range of 0.2 to 1.15 wt. %, Fe in a range of 0.19 to 0.6 wt. % (preferably 0.19 to 0.24 wt. %), Cr in a range of 0.07 to 0.4 wt. % (preferably 0.07 to 0.13 wt. %), Ta in a range of 0.01 to 0.2 wt. %, Nb in a range of 0.05 to 0.5 wt. % and less than 60 ppm of N.

The Zr alloy with similar composition to the above alloy was disclosed in FRP No. 2,769,637. In particular, this alloy comprises Sn in a range of 0.2 to 1.7 wt. %, Fe in range of 0.18 to 0.6 wt. %, Cr in range of 0.07 to 0.4 wt. %, Nb in a range of 0.05 to 1.0 wt. %, optionally Ta in a range of 0.01 to 0.1 wt. % and less than 60 ppm of N. Also, the heat treatment variable depending on compositions was described.

U.S. Pat. No. 5,560,790 discloses the alloy comprising Nb in a range of 0.5 to 1.5 wt. %, Sn 0.9 to 1.5 wt. %, Fe in a range of 0.3 to 0.6 wt. %, Cr in a range of 0.005 to 0.2 wt. %, C in a range of 0.005 to 0.04 wt. %, O in a range of 0.05 to 0.15 wt. % and Si 0.005 to 0.015 wt. %. The distance between the precipitates, $Zr(Nb, Fe)_2$, $Zr(Fe, Cr, Nb)$ and $(Zr, Nb)_3Fe$ was limited to the range of 0.20 to 0.40 μm, and the volume of the precipitate containing Fe was limited to 60% of the total volume of precipitate.

JP No. 5,214,500 discloses the alloy compositions for the improvement of corrosion resistance and the size of precipitates. The alloy composition comprises Sn in a range of 0.5 to 2.0 wt. %, Fe in a range of 0.05 to 0.3 wt. %, Cr in a range of 0.05 to 0.3 wt. %, Ni in a range of 0.05 to 0.15 wt. %, O in a range of 0.05 to 0.2 wt. %, Nb in a range of 0 to 1.2 wt. % and the balance being Zr, and the size of precipitate is limited to less than 0.5 μm.

JP No. 8,086,954 discloses the heat treatment variables introduced during hot and cold rolling in α phase and the Zr alloy comprising Sn in a range of 0.4 to 1.7 wt. %, Fe in a range of 0.25 to 0.75 wt. %, Cr in a range of 0.05 to 0.30 wt. %, Ni in a range of 0 to 0.10 wt. %, and Nb in a range of 0 to 1.0 wt. %.

JP No.8,114,688 discloses the duplex-type Zr alloy that has an inner layer which is formed with Sn—Fe—Cr—Ni alloy comprising Nb in a range of 0.05 to 0.75 wt. % and Si in a range of 0 to 0.02 wt. %, for reducing the stress corrosion cracking and secondary attack due to the hydrogen uptake.

JP No. 9,111,379 discloses the Zr alloy comprising Sn in a range of 0.5 to 1.7 wt. %, Fe in a range of 0.1 to 0.3 wt. %, Cr in a range of 0.05 to 0.2 wt. %, Cu in a range of 0.05 to 0.2 wt. %, Nb in a range of 0.01 to 1.0 wt. % and Ni in a range of 0.01 to 0.20 wt. % to prevent the nodular corrosion.

JP No. 10,273,746 discloses the Zr alloy with the improved workability and corrosion resistance comprising Sn in a range of 0.3 to 0.7 wt. %, Fe in a range of 0.2 to 0.25 wt. %, Cr in a range of 0.1 to 0.15 wt. % and Nb in a range of 0.05 to 0.20 wt. %.

In EP No. 198,570, the amount of Nb was limited to be from 1 to 2.5 wt. % in Zr—Nb alloys, and the temperature of the heat treatment was suggested. In this patent, the second phase containing Nb should be homogeneously distributed and the size of that should be less than about 800 Å.

U.S. Pat. No. 5,125,985 discloses the alloy comprising Nb in a range of 0.5 to 2.0 wt. %, Sn in a range of 0.7 to 1.5 wt. % and one or more elements selected from the group consisting of Fe, Ni and Cr in a range of 0.07 to 0.28 wt. %. The creep strength may be controlled according to the manufacturing method. At this time, the manufacturing method is characterized as the introduction of β-quenching heat treatment.

As described above, the Zr alloy of the prior art for nuclear fuel cladding is characterized as containing Nb to improve the corrosion resistance. However, considering the severe operation circumstance, the use of Zircaloys as material for fuel rod cladding becomes limited. Therefore, the development of an advanced Zr alloy with superior corrosion resistance and higher strength has been required.

We, the inventors of this invention, have investigated the enhancement of the corrosion resistance for the new Zircaloy-4, thereby we developed the Zr alloys containing Nb to improve the corrosion resistance of Zr alloy by adding Fe, Mo, Cu, Mn, etc. in small quantities.

SUMMARY OF THE INVENTION

It is the objective of this invention to provide compositions of the new Zr alloy with superior corrosion resistance.

It is the another objective of this invention to provide the Zr alloys for nuclear fuel claddings.

In order to attain the above objectives, the present invention provides an advanced Nb-containing Zr alloy with superior corrosion resistance.

In particular, the present invention provides the Zr alloy comprises Nb; one or more elements selected from the group consisting of Fe, Mo, Cu, Mn and Cr; O; Si; and the balance being of Zr. Also, Sn can be contained, optionally.

In embodiment of the present invention, there is provided a Zr alloy comprising Nb, in a range of 0.8 to 1.2 wt. %; one or more elements selected from the group consisting of Fe, Mo, Cu and Mn, in a range of 0.1 to 0.3 wt. %, respectively; O in a range of 600 to 1400 ppm; Si, in a range of 80 to 120 ppm; and the balance being of Zr.

In another embodiment of the present invention, there is provided a Zr alloy comprising Nb, in a range of 1.3 to 1.8 wt. %; tin (Sn), in a range of 0.2 to 0.5 wt. %; one element selected from the group consisting of Fe, Mo, Cu and Mn, in a range of 0.1 to 0.3 wt. %; O, in a range of 600 to 1400 ppm; Si, in a range of 80 to 120 ppm; and the balance being of Zr.

In a further embodiment of the present invention, there is provided a Zr alloy comprising Nb, in a range of 1.3 to 1.8 wt. %; Sn, in a range of 0.2 to 0.5 wt. %; Fe, in a range of 0.1 to 0.3 wt. %; one element selected from the group consisting of chromium (Cr), Mo, Cu and Mn, in a range of 0.1 to 0.3 wt. %; O in a range of 600 to 1400 ppm; Si, in a range of 80 to 120 ppm; and the balance being of Zr.

In still a further embodiment of the present invention, there is provided a Zr alloy comprising Nb, in a range of 0.3 to 1.2 wt. %; Sn, in a range of 0.4 to 1.2 wt. %; Fe, in a range of 0.1 to 0.5 wt. %; one element selected from the group consisting of Mo, Cu and Mn, in a range of 0.1 to 0.3 wt. %; O in a range of 600 to 1400 ppm; Si, in a range of 80 to 120 ppm; and the balance being of Zr.

DESCRIPTION OF THE PREFERRED EMBODIMENTS

The mechanical strength and corrosion resistance, especially corrosion resistance of the Nb-containing Zr alloy of the present invention have been improved by comprising small amount of Fe, Mo, Cu, Mn, etc.

The corrosion acceleration and the irradiation creep, especially the former are the main concerns in high burn-up fuel cladding. Therefore, this invention mainly aims at improving the corrosion resistance of Zr alloy.

The neutron effect, manufacturing cost, workability and alloying properties with Zr were considered in selecting the alloying elements. Also, the effects of each alloying element on corrosion resistance, hydrogen uptake, mechanical properties and creep behavior were evaluated in detail based on published paper until now, and the effects of other elements was reviewed in detail. The Zr alloying elements and the amount of each of the alloying elements were determined based on the above. Then, the present inventors constructed Zr-alloy composition with superior corrosion resistance and high strength. Particularly, the corrosion resistance was improved by adding Fe, Mo, Cu, Mn, etc. in small quantities.

The present invention provides a Zr alloy comprising Nb, in a range of 0.8 to 1.2 wt. %; one or more elements selected from the group consisting of Fe, Mo, Cu and Mn, in a range of 0.1 to 0.3 wt. %, respectively; O, in a range of 600 to 1400 ppm; Si, in a range of 80 to 120 ppm; and the balance being of Zr.

Preferably the Zr alloy comprises Nb, in a range of 0.8 to 1.2 wt. %; one element selected from the group consisting of Fe, Mo, Cu and Mn, in a range of 0.1 to 0.3 wt.%; O, in a range of 600 to 1400 ppm; Si, in a range of 80 to 120 ppm; and the balance being of Zr.

Also, the Zr alloy comprises Nb, in a range of 0.8 to 1.2 wt. %; Fe, in a range of 0.1 to 0.3 wt. %; one element selected from the group consisting of Mo, Cu and Mn, in a range 0.1 to 0.3 wt. %; O, in a range of 600 to 1400 ppm; Si, in a range of 80 to 120 ppm; and the balance being of Zr.

Still also, the present invention provides a Zr alloy comprising Nb, in a range of 1.3 to 1.8 wt. %; tin (Sn), in a range of 0.2 to 0.5 wt. %; one element selected from the group consisting of Fe, Mo, Cu and Mn, in a range of 0.1 to 0.3 wt. %; O, in a range of 600 to 1400 ppm; Si, in a range of 80 to 120 ppm; and the balance being of Zr.

Preferably the Zr alloy comprises Nb, in a range of 1.3 to 1.8 wt. %; Sn, in a range of 0.2 to 0.5 wt. %; Fe, in a range of 0.1 to 0.3 wt. %; O in a range of 600 to 1400 ppm; Si, in a range of 80 to 120 ppm; and the balance being of Zr.

Also, the Zr alloy comprises Nb, in a range of 1.3 to 1.8 wt. %; Sn, in a range of 0.2 to 0.5 wt. %; one element selected from the group consisting of Mo, Cu and Mn, in a range of 0.1 to 0.3 wt. %; O, in a range of 600 to 1400 ppm; Si, in a range of 80 to 120 ppm; and the balance being of Zr.

In addition, the present invention provides a Zr alloy comprising Nb, in a range of 1.3 to 1.8 wt. %; Sn, in a range of 0.2 to 0.5 wt. %; Fe, in a range of 0.1 to 0.3 wt. %; one element selected from the group consisting of chromium (Cr), Mo, Cu and Mn, in a range of 0.1 to 0.3 wt. %; O, in a range of 600 to 1400 ppm; Si, in a range of 80 to 120 ppm; and the balance being of Zr.

In addition, the present invention provides a Zr alloy comprising Nb, in a range of 0.3 to 1.2 wt. %; Sn, in a range of 0.4 to 1.2 wt. %; Fe, in a range of 0.1 to 0.5 wt. %; one element selected from the group consisting of Mo, Cu and Mn, in a range of 0.1 to 0.3 wt. %; O in a range of 600 to 1400 ppm; Si, in a range of 80 to 120 ppm; and the balance being of Zr.

Preferably the Zr alloy comprises Nb, in a range of 0.6 to 1.0 wt. %; Sn, in a range of 0.4 to 0.8 wt. %; Fe, in a range of 0.1 to 0.3 wt. %; one element selected from the group consisting of Mo, Cu and Mn, in a range of 0.1 to 0.3 wt. %; O in a range of 600 to 1400 ppm; Si, in a range of 80 to 120 ppm; and the balance being of Zr.

Also, the Zr alloy comprises Nb, in a range of 0.8 to 1.2 wt. %; Sn, in a range of 0.8 to 1.2 wt. %; Fe, in a range of 0.2 to 0.4 wt. %; one element selected from the group consisting of Mo, Cu and Mn, in a range of 0.1 to 0.3 wt. %; O, in a range of 600 to 1400 ppm; Si, in a range of 80 to 120 ppm; and the balance being of Zr.

Still also, the Zr alloy comprises Nb, in a range of 0.3 to 0.5 wt. %; Sn, in a range of 0.6 to 1.0 wt. %; Fe, in a range of 0.2 to 0.5 wt. %; Mo, in a range of 0.1 to 0.3 wt. %; O in a range of 600 to 1400 ppm; Si, in a range of 80 to 120 ppm; and the balance being of Zr.

The characteristics and the criticality of the compositional range of each alloying element of the present invention are described below in detail.

(1) Niobium (Nb)

Nb is known to stabilize β-phase of Zr. It is said that the corrosion resistance and the workability of the material are improved when Nb less than 0.5 wt. % is added. However, it is also said that Zr alloy has superior corrosion resistance when 1.0 wt. % of Nb is added. Also Nb is known to improve the hydrogen uptake and the strength. Because the alloys containing higher concentration of Nb are sensitive to heat treatment condition, Nb is added less than 1.8 wt. % in this invention.

(2) Tin (Sn)

Sn stabilizes α-phase of Zr and increases the strength of the Zr alloy. With a small amount of Sn, the desired strength and creep resistance can not be attained. On the contrary, it is preferable to decrease the amount of Sn in considering the corrosion resistance. The present inventors determined the amount of Sn considering both the strength and the corrosion resistance. Especially the amount of Sn is decreased to improve the corrosion resistance, while other alloying elements need to be added in exchange to maintain the strength instead of Sn. The amount of Sn in this invention is controlled depending on the amount of Nb, and Sn is added less than 1.2 wt. % in this invention.

(3) Iron (Fe)

Fe is known to increase corrosion resistance, and it is said that Fe typically improves corrosion resistance when it is added in a range of 0.1 to 0.6 wt. %. Also, Fe is known to have an effect on the mechanical properties and the hydrogen uptake. Therefore, the amount of Fe is limited from 0.1 to 0.5 wt. % in this invention.

(4) Chromium (Cr)

Cr is known to increase corrosion resistance like Fe, the preferred amount of Cr is limited from 0.1 to 0.3 wt. % in this invention.

(5) Molybdenum (Mo)

Mo is known to improve the corrosion resistance and the strength. Mo less than 0.05 wt. % affects the corrosion resistance while Mo more than 0.5 wt. % affects the strength. Therefore, Mo is preferably added in a range of 0.1 to 0.3 wt. %.

(6) Copper (Cu) and Manganese (Mn)

Cu and Mn are known to improve the corrosion resistance, especially when added in small quantities. Therefore, the amounts of Cu and Mn are limited in a range of 0.1 to 0.3 wt. %, respectively.

(7) Oxygen (O)

O improves the mechanical strength of alloys by the solid solution hardening. However, the workability decreases when O is added in large amounts Therefore, O is typically added in a range of 600 to 1400 ppm.

(8) Silicon (Si)

Si is added in a range of 80 to 120 ppm to reduce the hydrogen uptake and to delay the transition time of corrosion rate.

The Nb-containing Zr alloy of the present invention has superior corrosion resistance. Therefore, the Zr alloy of this invention can be utilized as a material for fuel rod claddings, spacer grids and other structural components in the reactor core of nuclear power plants. And it is possible to attain the integrity of nuclear fuel rod in high burn-up and extended cycle by using the Zr alloy of the present invention for the materials of the above structural components.

A better understanding of the present invention may be obtained in light of the following examples which are set forth to illustrate, but are not to be constructed to limit the present invention.

EXAMPLES 1–22

Preparation of Zr alloys 1–22

The Zr alloys with the composition of below Table 1 were prepared. The following Table 1 lists the chemical composition of Zr alloys in the present invention determined by the chemical analysis.

TABLE 1

The composition of zirconium alloys

| | Composition (wt. %) | | | | | | | | | |
|---|---|---|---|---|---|---|---|---|---|---|
| No. | Nb | Sn | Fe | Cr | Mn | Cu | Mo | O* | Si* | Zr** |
| 1 | 0.99 | — | — | — | — | — | — | 1108 | 112 | bal |
| 2 | 1.05 | — | — | — | 0.12 | — | — | 998 | 102 | bal |
| 3 | 1.08 | — | — | — | — | 0.11 | — | 1005 | 115 | bal |
| 4 | 1.11 | — | — | — | — | — | 0.13 | 995 | 92 | bal |
| 5 | 1.01 | — | 0.10 | — | 0.17 | — | — | 1200 | 105 | bal |
| 6 | 0.97 | — | 0.15 | — | — | 0.16 | — | 1016 | 113 | bal |
| 7 | 0.99 | — | 0.11 | — | — | — | 0.14 | 997 | 98 | bal |
| 8 | 1.62 | 0.39 | 0.14 | — | — | — | — | 1028 | 120 | bal |
| 9 | 1.74 | 0.43 | — | — | 0.16 | — | — | 1267 | 87 | bal |
| 10 | 1.38 | 0.44 | — | — | — | 0.13 | — | 989 | 99 | bal |
| 11 | 1.42 | 0.46 | — | — | — | — | 0.12 | 1111 | 106 | bal |
| 12 | 1.52 | 0.39 | 0.19 | 0.11 | — | — | — | 1101 | 113 | bal |
| 13 | 1.75 | 0.38 | 0.18 | — | 0.13 | — | — | 992 | 117 | bal |
| 14 | 1.56 | 0.44 | 0.16 | — | — | 0.15 | — | 1109 | 89 | bal |
| 15 | 1.39 | 0.37 | 0.17 | — | — | — | 0.14 | 1227 | 101 | bal |
| 16 | 0.82 | 0.58 | 0.14 | — | 0.12 | — | — | 978 | 114 | bal |
| 17 | 0.79 | 0.61 | 0.17 | — | — | 0.15 | — | 968 | 88 | bal |
| 18 | 0.83 | 0.59 | 0.19 | — | — | — | 0.14 | 1005 | 97 | bal |
| 19 | 0.99 | 1.11 | 0.31 | — | 0.14 | — | — | 1057 | 89 | bal |
| 20 | 0.97 | 1.08 | 0.33 | — | — | 0.15 | — | 1205 | 114 | bal |
| 21 | 1.02 | 1.01 | 0.32 | — | — | — | 0.14 | 1134 | 102 | bal |
| 22 | 0.42 | 0.85 | 0.43 | — | — | — | 0.19 | 1150 | 110 | bal |

*unit: ppm
**Zr + impurities: the balance

The manufacturing process is described below.

(1) Preparation of ingot

Ingots were prepared by melting the alloy composition shown in Table 1 into a 400 g button using the vacuum arc remelting (VAR) method. This process was repeated 5 times to prevent the segregation of impurities and the nonhomogeneous dispersion of the alloying elements.

The melting process was performed in water-cooling copper hearth with diameter of 70 mm in condition of about $2 \times 10^{-1}$ torr current of 1,000 A and pressure of cooling water of 1 kgf/cm². The pressure of chamber was lowered to $1 \times 10^{-5}$ torr and the chamber was filled with argon gas to avoid the oxidation of the alloys during the melting process. After melting of the alloy, the chamber pressure was maintained to be $1 \times 10^{-4}$ torr and the chamber was cooled by flowing argon gas in order to prevent the sample surface from oxidizing during the cooling process.

(2) β-heat treatment

β-heat treatment was performed by the solution treatment of ingot in β-region for homogenizing the alloy composition. The samples were cladded with stainless steal in thickness of 1 mm, heated at 1050° C. for 20 minutes, and then cooled in water in order to avoid oxidizing sample. After that, the sample was sufficiently dried at 80° C. for 24 hours to remove the remaining water in the cladding.

(3) Hot rolling and heat treatment

Hot rolling was performed by using 100 ton-size rolling machine. After preheating the samples at 650° C. for 20 minutes, they were rolled by 70% of its thickness in one pass. After hot rolling, the cladding was removed and the oxide layer, which was formed in β-treating or hot rolling, was removed with an acid pickling solution (HF:conc.HNO$_3$:H$_2$O=5:45:50 (v/v/v)). Also, the oxide partially remaining after acid-pickling was completely removed mechanically by using an electrical wire brush.

(4) Cold rolling and heat treatment

The samples were annealed at 590° C. for 30 min to remove the remaining strain after hot rolling and to prevent the breakage of the sample which may occur in cold working. The samples were first cold-rolled to reduce its thickness by about 0.5 mm in one pass (50 percentage reduction in thickness) by using 70 ton-size rolling machine. After the first cold-rolling, the samples were annealed for recrystallization at 580° C. The cold-rolling process was performed two times at 45% and 50% reduction in thickness, respectively. Final heat treatment of the samples was conducted at 470° C. for 3 hours to relax the stress.

EXPERIMENTAL EXAMPLE

Corrosion Test

The specimen of 15×25×0.7 mm was prepared with Zr alloy sheet, polish to 800 Grid, and acid-washed with solution (HF:conc.HNO$_3$:H$_2$O=5:45:50 (v/v/v)).

Corrosion test was performed in autoclave with an atmosphere of 360° C. of water (189.9 Mpa), 360° C. of 70 ppm LiOH aq. solution and 400° C. of steam (10.3 MPa) for 100–250 days. Corrosion rate was quantitatively estimated by measuring the weight gain of corroded specimen. Conventional Zircaloy-4, which has been used for nuclear cladding, was used as comparison. Results of corrosion test are listed in the following Table 2.

TABLE 2

Corrosion Test
Weight Grain (mg/dm²)

| No. | 360° C. water | | | 400° C. steam | | | 360° C. LiOH aq. soln. | | |
| --- | --- | --- | --- | --- | --- | --- | --- | --- | --- |
| | 100 days | 120 days | 250 days | 100 days | 120 days | 250 days | 100 days | 120 days | 250 days |
| 1 | 39 | 42 | 85 | 74 | 92 | 155 | 44 | 50 | 81 |
| 2 | 40 | 41 | 82 | 80 | 83 | 140 | 42 | 49 | 82 |
| 3 | 36 | 45 | 69 | 70 | 80 | 141 | 39 | 47 | 70 |
| 4 | 42 | 49 | 72 | 72 | 88 | 133 | 47 | 52 | 82 |
| 5 | 42 | 46 | 75 | 79 | 90 | 152 | 46 | 50 | 78 |
| 6 | 41 | 45 | 69 | 81 | 89 | 147 | 48 | 46 | 69 |
| 7 | 38 | 44 | 74 | 72 | 101 | 136 | 42 | 44 | 86 |
| 8 | 37 | 49 | 82 | 84 | 98 | 151 | 40 | 49 | 92 |
| 9 | 38 | 52 | 81 | 82 | 104 | 164 | 41 | 54 | 94 |
| 10 | 35 | 50 | 79 | 76 | 108 | 174 | 40 | 55 | 82 |
| 11 | 37 | 54 | 77 | 82 | 107 | 142 | 42 | 55 | 84 |
| 12 | 45 | 52 | 84 | 94 | 105 | 159 | 48 | 57 | 90 |
| 13 | 44 | 51 | 86 | 92 | 99 | 144 | 46 | 54 | 92 |
| 14 | 42 | 53 | 88 | 93 | 97 | 135 | 49 | 53 | 88 |
| 15 | 46 | 50 | 76 | 92 | 98 | 132 | 50 | 58 | 100 |
| 16 | 38 | 45 | 91 | 95 | 110 | 162 | 44 | 52 | 109 |
| 17 | 37 | 48 | 102 | 92 | 109 | 183 | 40 | 49 | 121 |
| 18 | 33 | 50 | 99 | 97 | 114 | 177 | 55 | 56 | 113 |
| 19 | 35 | 45 | 82 | 85 | 101 | 192 | 40 | 52 | 104 |
| 20 | 34 | 43 | 85 | 90 | 95 | 168 | 44 | 51 | 121 |
| 21 | 35 | 49 | 88 | 92 | 92 | 171 | 46 | 52 | 105 |
| 22 | 32 | 46 | 77 | 62 | 77 | 142 | 36 | 48 | 120 |
| Zircaloy-4 | 50 | 74 | 94 | 97 | 129 | 225 | 53 | 63 | 136 |

As shown in Table 2, Zr alloys of this invention displayed the better corrosion resistance than the former existing Zircaloy-4. The weight gain of corroded Zircaloy-4 in autoclave with an atmosphere of 360° C. of water for 100 days, 120 days and 250 days were 50, 74, 94 mg/dm2, respectively. On the other hand, the weight gain of corroded Zr alloys of the present invention were lower than that of Zircaloy-4. It was confirmed that the Zr alloy of the present invention displayed the superior corrosion resistance in atmosphere of LiOH aq. solution and steam in addition to in atmosphere of water. Particularly, the difference between the weight gain of Zircaloy-4 and Zr alloys of the present invention increased as the test time increased. That is, the corrosion resistance of the Zr alloy of the present invention was kept for longer time compared with the former existing Zircaloy-4.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A corrosion resistant Zr alloy composition consisting essentially of:

Nb, in a range of 0.8 to 1.2 wt. %;

one element selected from the group consisting of Mo, Cu and Mn, in a range of 0.1 to 0.3 wt. %;

O, in a range of 600 to 1400 ppm;

Si, in a range of 80 to 120 ppm; and the balance being of Zr wherein the alloy exhibits improved corrosion resistance over time in high temperature aqueous environments.

2. A corrosion resistant Zr alloy composition consisting essentially of:
   Nb, in a range of 0.8 to 1.2 wt. %;
   Fe, in a range of 0.1 to 0.3 wt. %;
   one element selected from the group consisting of Mo, Cu and Mn, in a range 0.1 to 0.3 wt. %;
   O, in a range of 600 to 1400 ppm;
   Si, in a range of 80 to 120 ppm; and
   the balance being of Zr wherein the alloy exhibits improved corrosion resistance over time in high temperature aqueous environments.

3. A Zr alloy composition comprising:
   Nb, in a range of 1.3 to 1.8 wt. %;
   Sn, in a range of 0.2 to 0.5 wt. %;
   one element selected from the group consisting of Mo, Cu and Mn, in a range of 0.1 to 0.3 wt. %;
   O, in a range of 600 to 1400 ppm;
   Si, in a range of 80 to 120 ppm; and
   the balance being of Zr.

4. A Zr alloy composition comprising:
   Nb, in a range of 1.3 to 1.8 wt. %;
   Sn, in a range of 0.2 to 0.5 wt. %;
   Fe, in a range of 0.1 to 0.3 wt. %;
   one element selected from the group consisting of chromium (Cr), Mo, Cu and Mn, in a range of 0.1 to 0.3 wt. %;
   O, in a range of 600 to 1400 ppm;
   Si, in a range of 80 to 120 ppm; and
   the balance being of Zr.

* * * * *